US012694126B2

(12) United States Patent
Lee et al.

(10) Patent No.: US 12,694,126 B2
(45) Date of Patent: Jul. 28, 2026

(54) METHOD AND APPARATUS FOR DETECTING PROPAGATION OF SECURITY VULNERABILITIES OF OPEN-SOURCE SOFTWARE INHERENT IN COMPONENTS OF TARGET SOFTWARE

(71) Applicant: KOREA UNIVERSITY RESEARCH AND BUSINESS FOUNDATION, Seoul (KR)

(72) Inventors: Heejo Lee, Seoul (KR); Seung-Hoon Woo, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 99 days.

(21) Appl. No.: 18/968,120

(22) Filed: Dec. 4, 2024

(65) Prior Publication Data

US 2025/0265353 A1 Aug. 21, 2025

(30) Foreign Application Priority Data

Feb. 19, 2024 (KR) ......................... 10-2024-0023236

(51) Int. Cl.
*G06F 21/00* (2013.01)
*G06F 21/54* (2013.01)
*G06F 21/57* (2013.01)

(52) U.S. Cl.
CPC ............ *G06F 21/577* (2013.01); *G06F 21/54* (2013.01)

(58) Field of Classification Search
CPC .. G06F 21/577; G06F 21/54; G06F 2221/033; G06F 21/575
See application file for complete search history.

(56) References Cited

U.S. PATENT DOCUMENTS

| | | | | |
|---|---|---|---|---|
| 2007/0067847 | A1* | 3/2007 | Wiemer | G06F 21/577 |
| | | | | 726/25 |
| 2022/0215100 | A1* | 7/2022 | Waplington | G06F 21/577 |
| 2023/0283629 | A1* | 9/2023 | Boyer | H04L 63/1416 |
| | | | | 726/22 |
| 2025/0030725 | A1* | 1/2025 | Fellows | H04L 63/1433 |
| 2026/0105395 | A1* | 4/2026 | Chen | G06Q 10/0633 |

FOREIGN PATENT DOCUMENTS

KR 10-1792631 B1 11/2017

* cited by examiner

*Primary Examiner* — Mahfuzur Rahman
(74) *Attorney, Agent, or Firm* — BROADVIEW IP LAW, PC

(57) ABSTRACT

A security vulnerability propagation detection apparatus according to an embodiment may perform the operations of: obtaining version information of target software and open-source software used in the target software; classifying functions included in the version of open-source software into a first function used identically in the target software, a second function modified and used, and a third function not used; determining whether the second function has been patched, based on a first similarity between the second function and an original function of the version and a second similarity between the second function and a patch function of the version; and detecting a vulnerability propagated to the target software from vulnerabilities inherent in the version of open-source software, based on the classification of the first function, the second function, and the third function, and the patch status of the second function.

9 Claims, 8 Drawing Sheets

MEMORY (110)

PROCESSOR (120)

INPUT/OUTPUT INTERFACE (130)

COMMUNICATION INTERFACE (140)

FIG.1

| | |
|---|---|
| MEMORY (110) | PROCESSOR (120) |
| INPUT/OUTPUT INTERFACE (130) | COMMUNICATION INTERFACE (140) |

FIG.2

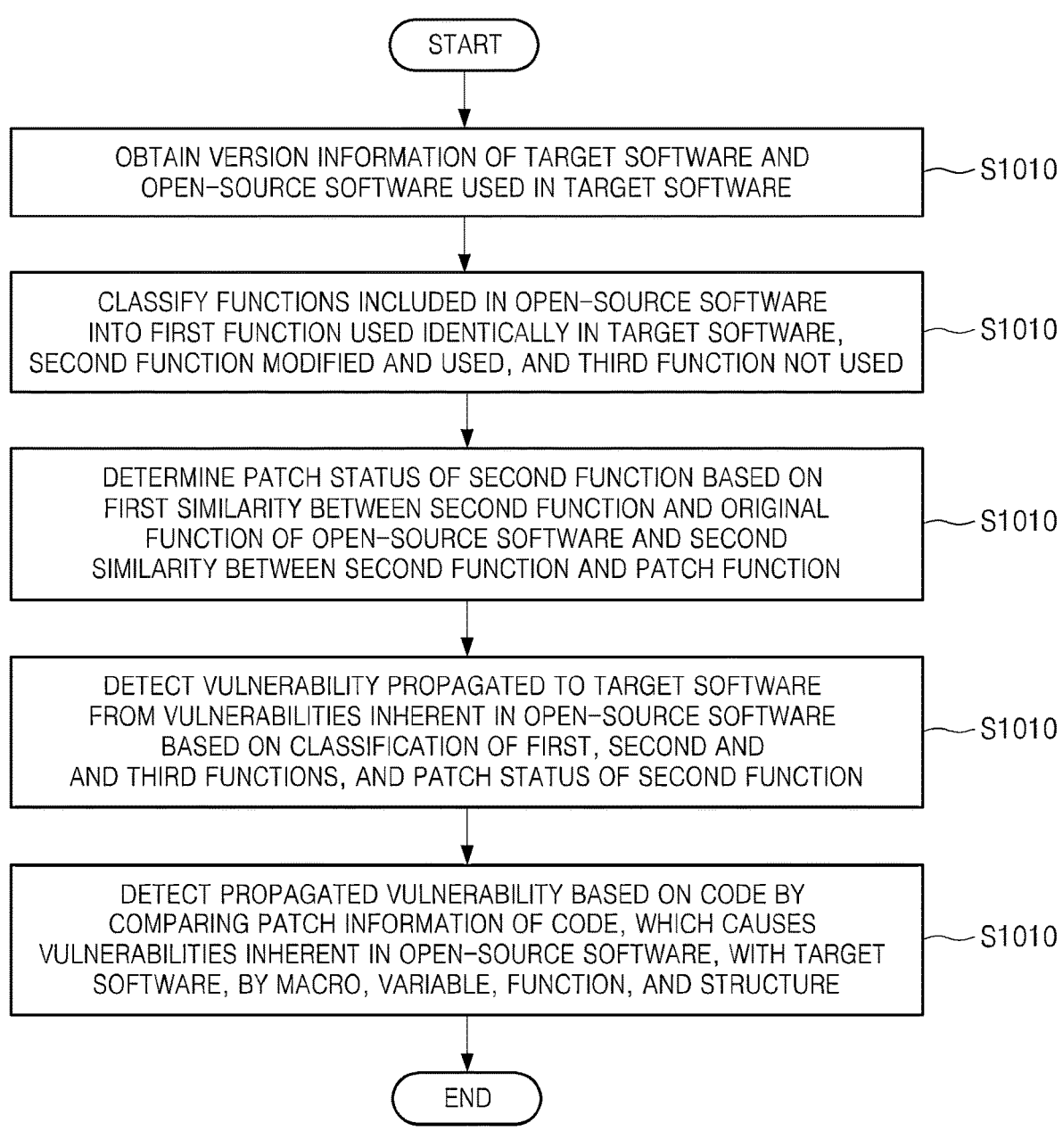

START

OBTAIN VERSION INFORMATION OF TARGET SOFTWARE AND
OPEN-SOURCE SOFTWARE USED IN TARGET SOFTWARE — S1010

CLASSIFY FUNCTIONS INCLUDED IN OPEN-SOURCE SOFTWARE
INTO FIRST FUNCTION USED IDENTICALLY IN TARGET SOFTWARE,
SECOND FUNCTION MODIFIED AND USED, AND THIRD FUNCTION NOT USED — S1010

DETERMINE PATCH STATUS OF SECOND FUNCTION BASED ON
FIRST SIMILARITY BETWEEN SECOND FUNCTION AND ORIGINAL
FUNCTION OF OPEN-SOURCE SOFTWARE AND SECOND
SIMILARITY BETWEEN SECOND FUNCTION AND PATCH FUNCTION — S1010

DETECT VULNERABILITY PROPAGATED TO TARGET SOFTWARE
FROM VULNERABILITIES INHERENT IN OPEN-SOURCE SOFTWARE
BASED ON CLASSIFICATION OF FIRST, SECOND AND
AND THIRD FUNCTIONS, AND PATCH STATUS OF SECOND FUNCTION — S1010

DETECT PROPAGATED VULNERABILITY BASED ON CODE BY
COMPARING PATCH INFORMATION OF CODE, WHICH CAUSES
VULNERABILITIES INHERENT IN OPEN-SOURCE SOFTWARE, WITH TARGET
SOFTWARE, BY MACRO, VARIABLE, FUNCTION, AND STRUCTURE — S1010

END

FIG.5

| OPEN SOURCE (ver 1.1.2) VULNERABILITY INFORMATION | ORIGINAL FUNCTION | PATCH FUNCTION |
|---|---|---|
| VULNERABILITY 1 | f1 | f'1 |
| VULNERABILITY 2 | f2 | f'2 |
| VULNERABILITY 3 | f3 | f'3 |
| ... | ... | ... |
| ... | ... | ... |

FIG.6

| SECOND FUNCTION IN TARGET SOFTWARE | SIMILARITY WITH ORIGINAL FUNCTION | SIMILARITY WITH PATCH FUNCTION | PATCH STATUS OF SECOND FUNCTION |
|---|---|---|---|
| t1 | f1 – 80% | f'1 – 30% | PATCH x |
| t2 | f2 – 20% | f'2 – 90% | PATCH o |
| t3 | f3 – 30% | f'3 – 85% | PATCH o |
| ... | ... | ... | ... |
| ... | ... | ... | ... |

METHOD AND APPARATUS FOR DETECTING PROPAGATION OF SECURITY VULNERABILITIES OF OPEN-SOURCE SOFTWARE INHERENT IN COMPONENTS OF TARGET SOFTWARE

CROSS-REFERENCE TO RELATED PATENT APPLICATION

This application claims the benefit of Korean Patent Application No. 10-2024-0023236, filed on Feb. 19, 2024, in the Korean Intellectual Property Office, the disclosure of which is incorporated herein in its entirety by reference.

BACKGROUND OF THE INVENTION

1. Field of the Invention

The present invention relates to a technology for detecting whether security vulnerabilities inherent in open-source software have been propagated to target software, which is configured by reusing the source code of the original open-source software containing these security vulnerabilities.

2. Description of the Related Art

Open-source software refers to software whose source code is publicly available, allowing anyone to reuse, modify, and redistribute it, provided they comply with the license terms. In this case, when the source code of open-source software containing security vulnerabilities is reused in other software, the security vulnerabilities inherent in the original open-source software are propagated as-is, and this phenomenon is known as vulnerability propagation.

Meanwhile, due to the inherent characteristics of software distribution, which occurs very quickly and easily, if security vulnerabilities are propagated to a wide range of terminals, it leads to the problem of compromising the overall security of the software ecosystem.

Currently, to mitigate this issue, version-based detection technology, which detects known vulnerabilities based on the version of the distributed open-source software, and code-based detection technology, which detects vulnerabilities based on the source code, are primarily used.

The version-based detection technology detects vulnerabilities propagated to other software based on the names of components and the version information of the reused open-source software. Typically, software that reuses open-source components specifies both the component names and the version information of the reused open-source software. Accordingly, the version-based detection technology can detect vulnerabilities inherent in specific software based on the version of open-source software that has been reused by the specific software.

However, in most cases, only the necessary portion of the open-source software code is reused, or the original code is modified during the reuse process. In other words, there are cases where a portion of the open-source software containing specific vulnerabilities is not reused, or where a portion of the open-source software containing vulnerabilities is modified before reuse. As a result, the version-based vulnerability detection technology may lead to the problem of false positives by detecting vulnerabilities in portions that were not reused, even though those vulnerabilities are not actually present.

The code-based detection technology detects propagated vulnerabilities by analyzing the source code of the open-source software that has actually been reused and identifying whether it contains code similar to known vulnerabilities. Meanwhile, during the reuse of the source code of open-source software, the original code may be modified. As a result, the code-based detection technology may fail to detect vulnerabilities when the code, containing inherent vulnerabilities, is partially modified before reuse, leading to the problem of false negatives.

Accordingly, given the characteristics of open-source software reuse, where only the necessary portion of the open-source software code may be reused, or the original code may be modified during the reuse process, it is essential to accurately detect vulnerabilities propagated to the target software.

REFERENCES OF THE RELATED ART

Patent Document

Korean Patent No.: 10-1792631

SUMMARY OF THE INVENTION

The present invention has been made in an effort to solve the above-described problems associated with prior art, and an object of the present invention is to provide a technology that can accurately distinguish and detect vulnerabilities propagated to target software from those that have not been propagated, given the characteristics of open-source software reuse, where only a portion of the source code may be reused or the original code may be modified during the reuse process, thereby preventing the problems of false positives and false negatives in security vulnerability detection.

Meanwhile, the technical objects of the present invention are not limited to those mentioned above, and other technical objects not mentioned will be clearly understood by those skilled in the art from the following description.

To achieve the aforementioned objects, an embodiment of the present invention provides a method of operation for a security vulnerability propagation detection apparatus operating by a processor, the method comprising the operations of: obtaining version information of target software and open-source software used in the target software; classifying functions included in the version of open-source software into a first function used identically in the target software, a second function modified and used, and a third function not used; determining whether the second function has been patched, based on a first similarity between the second function and an original function of the version and a second similarity between the second function and a patch function of the version; and detecting a vulnerability propagated to the target software from vulnerabilities inherent in the version of open-source software, based on the classification of the first function, the second function, and the third function, and the patch status of the second function.

The version information may include information on functions included in the version of open-source software, vulnerabilities inherent in the version of open-source software, functions causing the vulnerabilities, and patch functions that supplement the functions causing the vulnerabilities.

The operation of classifying may comprise: generating first hash information by hashing the functions included in the target software and second hash information by hashing the functions included in the open-source software; deriving the similarity between the first hash information and the second hash information; and classifying the functions included in the open-source software into one of the first function, the second function, and the third function based on a predefined range for the derived similarity.

The operation of determining the patch status may comprise: if the first similarity is greater than the second similarity, determining that the second function is a function in which the vulnerability inherent in the original has not been patched; and if the second similarity is greater than the first similarity, determining that the second function is a function in which the vulnerability inherent in the original has been patched.

The operation of detecting a vulnerability may comprise: detecting that the vulnerability corresponding to the first function, inherent in the open-source software, has been propagated; detecting that the vulnerability of the second function, determined to be patched, has not been propagated; detecting that the vulnerability of the second function, determined to be unpatched, has been propagated; and detecting that the vulnerability corresponding to the third function has not been propagated.

The method may further comprise the operation of detecting a propagated vulnerability based on the code by comparing the patch information of the code that causes the vulnerabilities inherent in the open-source software with the target software, by macro, variable, function, and structure.

The operation of detecting a propagated vulnerability based on the code may comprise the operations of: classifying the patch information of the code that causes the vulnerabilities inherent in the open-source software by macro, variable, function, and structure; generating third hash information by hashing each function or structure included in the target software and fourth hash information by hashing each function or structure included in the patch information; detecting a vulnerability propagated to the macro or variable included in the target software by comparing the code of the macro or variable according to the patch information with the code of the macro or variable included in the target software; and detecting a vulnerability propagated to the function or structure included in the target software by comparing the third hash information with the fourth hash information.

The operation of detecting a vulnerability propagated to the macro or variable may comprise the operations of: detecting that the vulnerability has not been propagated if the code of the macro or variable according to the patch information is identical to the code included in the target software; and detecting that the vulnerability included in the reused version of open-source software has been propagated if the code of the macro or variable according to the patch information is not identical to the code included in the target software.

The operation of detecting that the vulnerability propagated to the function or structure may comprise the operations of: detecting that the vulnerability has not been propagated to the function or structure included in the target software if the similarity of the third hash information is determined to be identical to that of the fourth hash information; and detecting that the vulnerability has been propagated to the function or structure included in the reused version of open-source software if the similarity of the third hash information is determined to be different from that of the fourth hash information.

To achieve the aforementioned objects, another embodiment of the present invention provides a security vulnerability propagation detection apparatus comprising: a memory having instructions stored thereon; and a processor performing predetermined operations based on the instructions, wherein the operations of the processor may comprise: obtaining version information of target software and open-source software used in the target software; classifying functions included in the version of open-source software into a first function used identically in the target software, a second function modified and used, and a third function not used; determining whether the second function has been patched, based on a first similarity between the second function and an original function of the version and a second similarity between the second function and a patch function of the version; and detecting a vulnerability propagated to the target software from vulnerabilities inherent in the version of open-source software, based on the classification of the first function, the second function, and the third function, and the patch status of the second function.

The version information may include information on functions included in the version of open-source software, vulnerabilities inherent in the version of open-source software, functions causing the vulnerabilities, and patch functions that supplement the functions causing the vulnerabilities.

The operation of classifying may comprise: generating first hash information by hashing the functions included in the target software and second hash information by hashing the functions included in the open-source software; deriving the similarity between the first hash information and the second hash information; and classifying the functions included in the open-source software into one of the first function, the second function, and the third function based on a predefined range for the derived similarity.

The operation of determining the patch status may comprise: if the first similarity is greater than the second similarity, determining that the second function is a function in which the vulnerability inherent in the original has not been patched; and if the second similarity is greater than the first similarity, determining that the second function is a function in which the vulnerability inherent in the original has been patched.

The operation of detecting a vulnerability may comprise: detecting that the vulnerability corresponding to the first function, inherent in the open-source software, has been propagated; detecting that the vulnerability of the second function, determined to be patched, has not been propagated; detecting that the vulnerability of the second function, determined to be unpatched, has been propagated; and detecting that the vulnerability corresponding to the third function has not been propagated.

The operations of the processor may further comprise the operation of detecting a propagated vulnerability based on the code by comparing the patch information of the code that causes the vulnerabilities inherent in the open-source software with the target software, by macro, variable, function, and structure.

The operation of detecting a propagated vulnerability based on the code may comprise the operations of: classifying the patch information of the code that causes the vulnerabilities inherent in the open-source software by macro, variable, function, and structure; generating third hash information by hashing each function or structure included in the target software and fourth hash information by hashing each function or structure included in the patch information; detecting a vulnerability propagated to the macro or variable included in the target software by comparing the code of the macro or variable according to the patch information with the code of the macro or variable included in the target software; and detecting a vulnerability propagated to the function or structure included in the target software by comparing the third hash information with the fourth hash information.

The operation of detecting a vulnerability propagated to the macro or variable may comprise the operations of: detecting that the vulnerability has not been propagated if the code of the macro or variable according to the patch information is identical to the code included in the target software; and detecting that the vulnerability included in the reused version of open-source software has been propagated if the code of the macro or variable according to the patch information is not identical to the code included in the target software.

The operation of detecting that the vulnerability propagated to the function or structure may comprise the operations of: detecting that the vulnerability has not been propagated to the function or structure included in the target software if the similarity of the third hash information is determined to be identical to that of the fourth hash information; and detecting that the vulnerability has been propagated to the function or structure included in the reused version of open-source software if the similarity of the third hash information is determined to be different from that of the fourth hash information.

The present invention can compare the functions included in the target software, which is the subject of vulnerability detection, with the functions included in the open-source software, and classify the functions of open-source software into a first function used identically in the target software, a second function modified and used in the target software, and a third function not used in the target software. In other words, the present invention can identify the portions of code reused by the target software and those that are not reused, and can clearly specify the portions where modifications have been made to the functions of the open-source software. Accordingly, the present invention can detect the vulnerabilities that have been actually propagated from the open-source software to the target software, significantly reducing the problems of false positives and false negatives in security vulnerability detection.

Furthermore, the present invention can classify the patch information of the code that causes vulnerabilities inherent in open-source software by macro, variable, function, and structure, and can efficiently perform code-based vulnerability detection by comparing hash information generated by hashing each function or structure.

As a result, the present invention can be effectively utilized for security vulnerability detection, applied to software supply chain security, and ultimately contribute to the establishment of a secure software ecosystem.

Meanwhile, the effects of the present invention are not limited to those mentioned above, and other technical effects not mentioned will be clearly understood by those skilled in the art from the following description.

BRIEF DESCRIPTION OF THE DRAWINGS

The above and other features and advantages of the present invention will become more apparent by describing in detail exemplary embodiments thereof with reference to the attached drawings in which:

FIG. 1 is a block diagram of a security vulnerability propagation detection apparatus according to an embodiment;

FIG. 2 is a flowchart illustrating the operations performed by the security vulnerability propagation detection apparatus according to an embodiment;

FIG. 5 is a diagram illustrating an example of vulnerability information on open-source software distributed for a specific version according to an embodiment, showing original functions with vulnerabilities in that version and patch functions that can mitigate the vulnerabilities of the original functions;

FIG. 6 is an exemplary diagram of an operation for determining whether a second function has been patched by comparing the second function with the original function and the patch function, respectively, according to an embodiment;

DETAILED DESCRIPTION OF THE INVENTION

Figure 3:
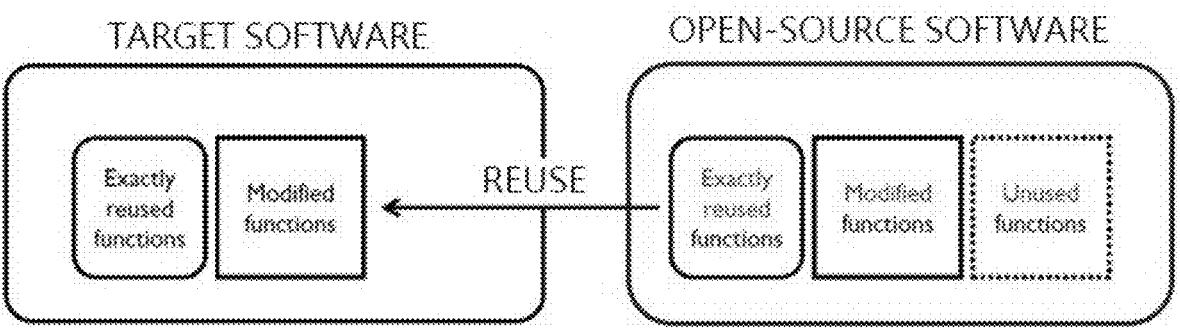
FIG. 3 is a diagram illustrating an example in which target software uses functions from open-source software according to an embodiment.

Details regarding the objects and technical features of the present invention and the resulting effects will be more clearly understood from the following detailed description based on the drawings attached to the specification of the present invention. Preferred embodiments according to the present invention will be described in detail with reference to the attached drawings.

The embodiments disclosed in this specification should not be construed or used as limiting the scope of the present invention. It is obvious to those skilled in the art that the description, including the embodiments, of this specification has various applications. Therefore, any embodiments described in the detailed description of the present invention are illustrative to better illustrate the present invention and are not intended to limit the scope of the present invention to the embodiments.

The functional blocks shown in the drawings and described below are only examples of possible implementations. In other implementations, different functional blocks may be used without departing from the spirit and scope of the detailed description. Moreover, although one or more functional blocks of the present invention are shown as individual blocks, one or more of the functional blocks of the present invention may be a combination of various hardware and software components that perform the same function.

Furthermore, the term "comprising" certain components, which is an "open-ended" term, simply refers to the presence of the corresponding components, and should not be understood as excluding the presence of additional components.

In addition, if a specific component is referred to as being "connected" or "coupled" to another component, it should be understood that it may be directly connected or coupled to another other component, but there may be other components therebetween.

Hereinafter, various embodiments of the present invention will be described with reference to the attached drawings. However, this is not intended to limit the present invention to specific embodiments, but it should be understood to include various modifications, equivalents, and/or alternatives of the embodiments of the present invention.

The present invention can detect whether security vulnerabilities inherent in open-source software have been propagated to target software, which is configured by reusing the source code of the original open-source software containing these security vulnerabilities.

Before describing the present invention, Open-source software refers to software whose source code is publicly available, allowing anyone to reuse, modify, and redistribute it, provided they comply with the license terms. In this case, when the source code of open-source software containing security vulnerabilities is reused in other software, the security vulnerabilities inherent in the original open-source software are propagated as-is, and this phenomenon is known as vulnerability propagation.

Meanwhile, due to the inherent characteristics of software distribution, which occurs very quickly and easily, if security vulnerabilities are propagated to a wide range of terminals, it leads to the problem of compromising the overall security of the software ecosystem.

Currently, to mitigate this issue, version-based detection technology, which detects known vulnerabilities based on the version of the distributed open-source software, and code-based detection technology, which detects vulnerabilities based on the source code, are primarily used.

The version-based detection technology detects vulnerabilities propagated to other software based on the names of components and the version information of the reused open-source software. Typically, software that reuses open-source components specifies both the component names and the version information of the reused open-source software. Accordingly, the version-based detection technology can detect vulnerabilities inherent in specific software based on the version of open-source software that has been reused by the specific software.

However, in most cases, only the necessary portion of the open-source software code is reused, or the original code is modified during the reuse process. In other words, there are cases where a portion of the open-source software containing specific vulnerabilities is not reused, or where a portion of the open-source software containing vulnerabilities is modified before reuse. As a result, the version-based vulnerability detection technology may lead to the problem of false positives by detecting vulnerabilities in portions that were not reused, even though those vulnerabilities are not actually present.

The code-based detection technology detects propagated vulnerabilities by analyzing the source code of the open-source software that has actually been reused and identifying whether it contains code similar to known vulnerabilities. Meanwhile, during the reuse of the source code of open-source software, the original code may be modified. As a result, the code-based detection technology may fail to detect vulnerabilities when the code, containing inherent vulnerabilities, is partially modified before reuse, leading to the problem of false negatives.

Figure 1:
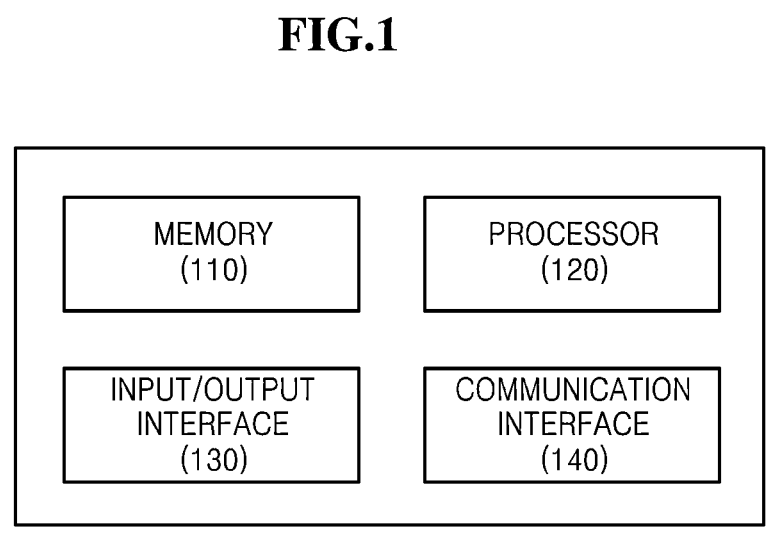

The present invention provides a technology that can accurately distinguish and detect vulnerabilities propagated to target software from those that have not been propagated, according to the embodiments shown in FIGS. 1 to 8, given the characteristics of open-source software reuse, where only a portion of the source code may be reused or the original code may be modified during the reuse process, thereby preventing the problems of false positives and false negatives in security vulnerability detection.

FIG. 1 is a block diagram of a security vulnerability propagation detection apparatus 100 (hereinafter referred to as the "apparatus 100") according to an embodiment.

Referring to FIG. 1, the apparatus 100 according to an embodiment may comprise a memory 110, a processor 120, an input/output interface 130, and a communication interface 140.

The memory 110 may store data obtained from an external device or data generated internally. The memory 110 may store instructions to execute the operations of the processor 120. Moreover, the memory 110 may store information on target software and information on open-source software used in the target software, which will be described later.

The processor 120 is an operational device that controls overall operations. The processor 120 may execute the instructions stored in the memory 110. In accordance with the embodiment of the present disclosure, the operations of the apparatus 100 shown in FIG. 2, which will be described later, can be understood as being performed by the processor 120.

The input/output interface 130 may include a hardware interface or software interface for inputting or outputting information.

The communication interface 140 enables transmission and reception of information over a communication network. To this end, the communication interface 140 may include a wireless communication module or a wired communication module.

The apparatus 100 may be implemented in various types of devices capable of performing the operations via the processor 120 and transmitting and receiving information through a network. For example, it may be implemented as a server, computer device, portable communication device, smartphone, portable multimedia device, laptop, tablet PC, etc., but is not limited to these examples.

FIG. 2 is a flowchart illustrating the operations performed by the apparatus 100 according to an embodiment. The operations of the apparatus 100 in the embodiment of FIG. 2 can be understood as being performed by the processor 120.

Each step shown in FIG. 2 is merely a preferred embodiment for achieving the objectives of the present invention, and certain steps may be added or deleted as needed. Additionally, one step may be performed as part of another step. The order of the operations shown in FIG. 2 is arranged for convenience of understanding, and this order is not limited to a chronological sequence. The order may be modified and executed differently depending on the designer's choice.

In step S1010, the apparatus 100 may obtain version information of target software and open-source software used in the target software. The target software refers to the software created by reusing the source code of open-source software, and it is the software subject to detecting vulnerabilities propagated through the reuse of the open-source software.

The apparatus 100 may obtain the version information of the open-source software from the name and version information of the open-source software specified in the target software. Furthermore, the apparatus 100 may obtain the version information of the open-source software used by the target software based on the source code in the target software.

Open-source software not only releases its source code to allow anyone to reuse, modify, and redistribute it, but also discloses information on known vulnerabilities for a specific version and patch information for mitigating those vulnerabilities. Accordingly, the apparatus 100 may obtain information on known vulnerabilities for the corresponding version of the open-source software based on the version information of the open-source software. Specifically, the apparatus 100 may obtain information on functions included in the corresponding version of the open-source software, vulnerabilities inherent in the version of open-source software, functions causing the vulnerabilities, and patch functions that supplement the functions causing the vulnerabilities, based on the version information of the open-source software.

FIG. 3 is a diagram illustrating an example in which target software uses functions from open-source software according to an embodiment.

Referring to FIG. 3, in the case where the target software reuses the functions from the open-source software, 1) it may reuse only the necessary portion (Exactly reused functions), 2) it may modify the original code before reuse (Modified functions), or 3) it may choose not to use the unnecessary portions (Unused functions).

Meanwhile, the version information of the open-source software, i.e., the vulnerability information on a specific version of the open-source software, is specified based on the functions included in the open-source software. Therefore, when applying the version-based detection technology to the target software based on a specific version, the problems of false positives and false negatives may occur due to the reuse characteristics shown in FIG. 3. For example, the problem of false positives may occur when a specific vulnerability in open-source software is detected as a vulnerability in the target software, even though the portion containing the vulnerability is not reused, and the problem of false negatives may occur when a portion of the open-source software containing a vulnerability is modified and used in the target software, but it is not recognized as the same function due to the modification. To address these problems, the apparatus 100 may classify the functions included in the open-source software as shown in FIG. 4.

Figure 4:
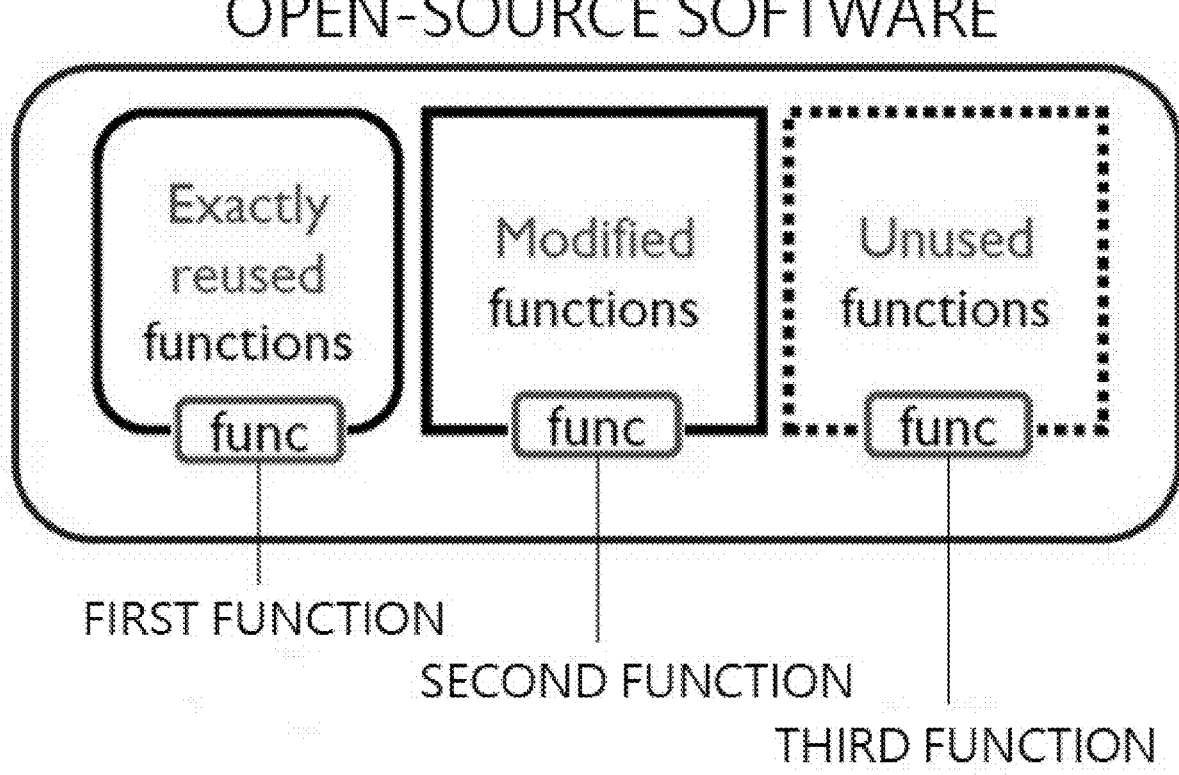
FIG. 4 is an exemplary diagram classifying functions included in open-source software that are used in target software according to an embodiment.

FIG. 4 is an exemplary diagram classifying functions included in open-source software that are used in target software according to an embodiment.

Referring to FIG. 4, in step S1020, the apparatus 100 may classify the functions of the open-source software into a first function used identically in the target software, a second function modified and used in the target software, and a third function not used in the target software.

For example, the apparatus 100 may generate first hash information by hashing the code of each function included in the target software and second hash information by hashing the code of each function included in the open-source software. For example, the apparatus 100 may generate hash information based on a fuzzy hash using the TLSH algorithm.

Subsequently, the apparatus 100 may derive the similarity between the first hash information and the second hash information. For example, the apparatus 100 may determine the similarity using the ssdeep algorithm. Specifically, the apparatus 100 may compare the second hash information of each function included in the open-source software with the first hash information of all functions included in the target software. Accordingly, if the similarity score between specific second hash information and specific first hash information is '0', it is determined that the two hash information are 'identical', and the functions corresponding to the first and second hash information are classified as the first function; if the score is greater than 0 and less than or equal to 30, it is determined that the two hash information are 'similar', and the functions corresponding to the first and second hash information are classified as the second function; and if the score is greater than 30, it is determined that the two hash information are 'dissimilar', and the functions corresponding to the second hash information are classified as the third function. Meanwhile, the range for determining identical/similar/dissimilar based on the similarity score may be modified depending on the design.

In this case, the function classified as the first function, determined to be 'identical', is one that is used exactly. Therefore, if this function contains a vulnerability from the open-source software, it can be considered that the vulnerability from the open-source software has been propagated to the target software. Moreover, the function classified as the third function, determined to be 'dissimilar, is one that is not used in the target software. Therefore, if this function contains a vulnerability from the open-source software, it can be considered that the vulnerability from the open-source software has not been propagated to the target software.

Meanwhile, to determine whether the function classified as a second function, determined to be 'similar', contains a vulnerability propagated from the open-source software, it is necessary to assess whether it has been simply modified to fit the configuration of the target software or modified to improve the vulnerability information. This is because if it has been simply modified to fit the configuration of the target software before use, it can be considered that the vulnerability from the open-source software has been propagated, whereas if it has been modified to improve the vulnerability information before use, it can be considered that the vulnerability has not been propagated.

FIG. 5 is a diagram illustrating an example of vulnerability information on open-source software distributed for a specific version according to an embodiment, showing original functions with vulnerabilities in that version and patch functions that can mitigate the vulnerabilities of the original functions.

Referring to FIG. 5, the apparatus 100 may determine whether the second function is more similar to the original function or to the patch function, thereby determining whether the second function has been simply modified to fit the configuration of the target software or patched to improve the vulnerability information.

FIG. 6 is an exemplary diagram of an operation for determining whether a second function has been patched by comparing the second function with the original function and the patch function, respectively, according to an embodiment.

Referring to FIG. 6, in step S1030, the apparatus 100 may derive a first similarity between the second function and an original function of the open-source version and a second similarity between the second function and a patch function that improves the original function of the open-source version. If the second function has a higher similarity with the original function than with the patch function, the apparatus 100 may determine that the second function has not been patched. If the second function shows a higher similarity with the patch function than with the original function, the apparatus 100 may determine that the second function has been patched to mitigate the vulnerabilities. Meanwhile, the operation of determining the similarity between the functions can be performed using various known comparison algorithms.

In step S1040, based on the classification of the first function, the second function, and the third function, and the patch status of the second function, the apparatus 100 may detect a vulnerability propagated to the target software from the vulnerabilities inherent in the reused version of the open-source software. For example, the apparatus 100 may detect that the vulnerability corresponding to the first function, inherent in the open-source software, has been propagated, detect that the vulnerability of the second function, determined to be patched, has not been propagated, detect that the vulnerability of the second function, determined to be unpatched, has been propagated, and detect that the vulnerability corresponding to the third function has not been propagated.

In step S1050, the apparatus 100 may detect a propagated vulnerability based on the code by comparing the patch information of the code that causes the vulnerabilities inherent in the open-source software with the target software, by macro, variable, function, and structure.

Figure 7:
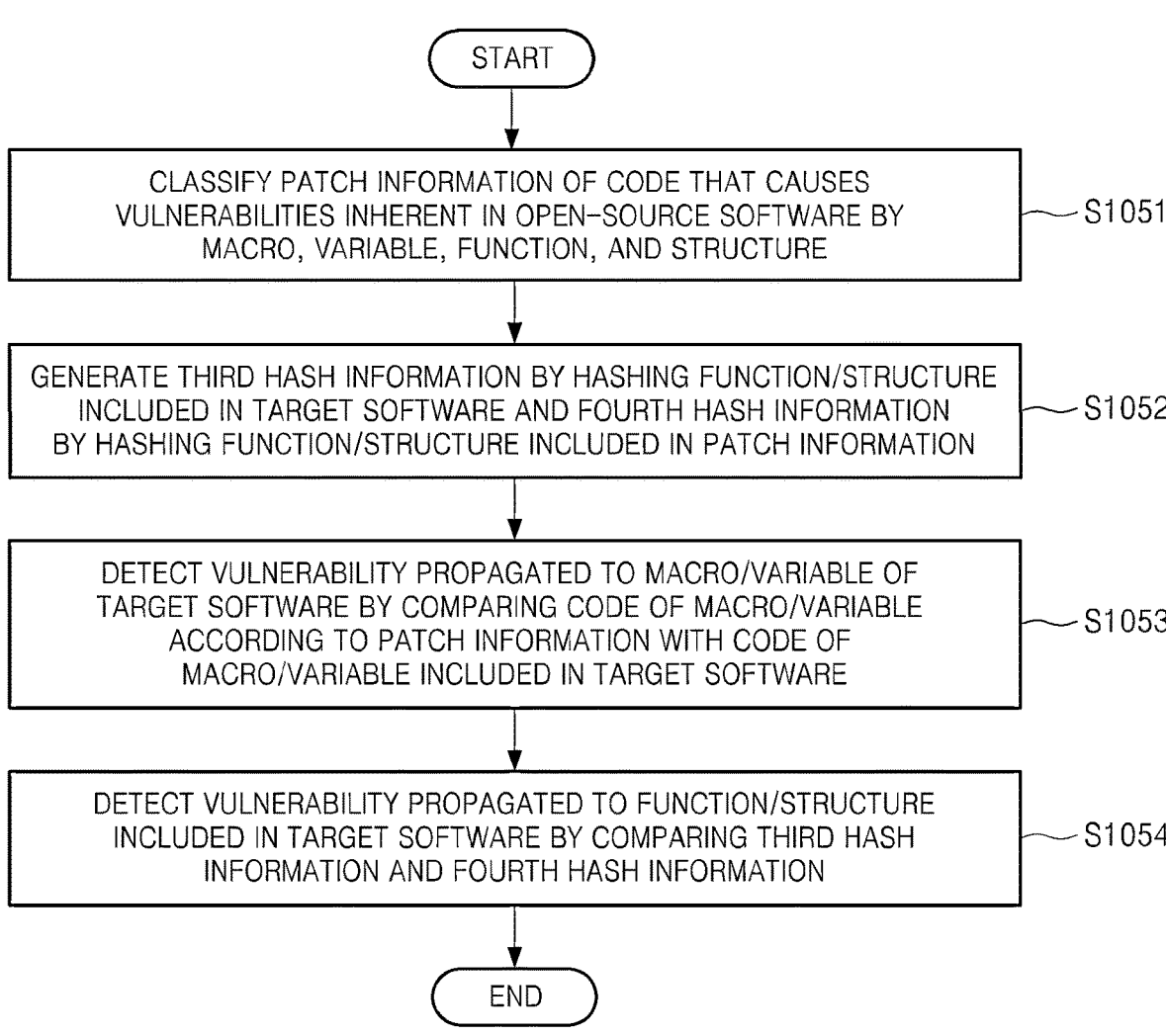
FIG. 7 is a flowchart specifying the operation of S1050 according to an embodiment.
Figure 8:
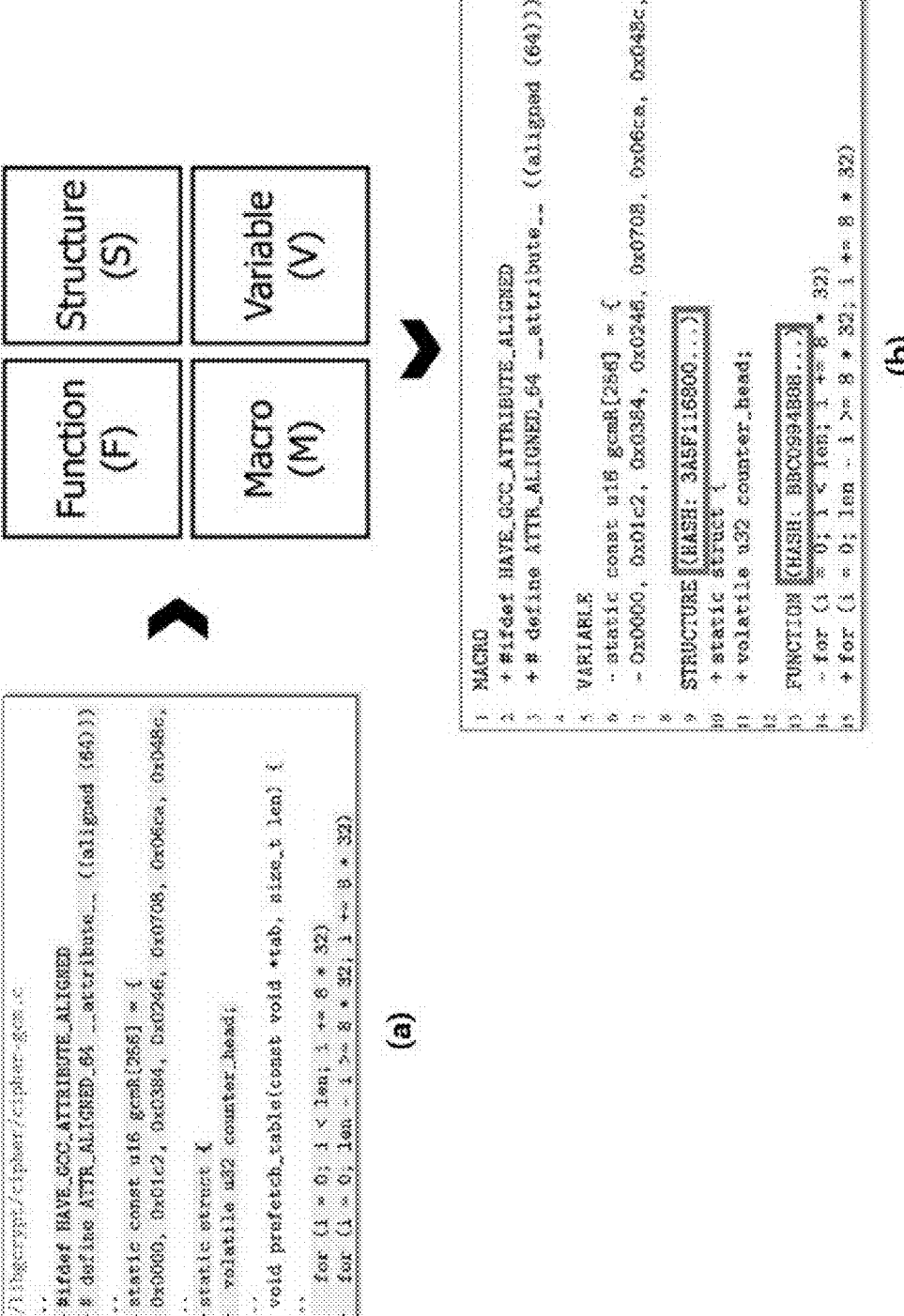
FIG. 8 is a diagram illustrating the operations of preprocessing (b) patch information (a) of code that causes vulnerabilities inherent in open-source software, by classifying the patch information into macro, variable, function, and structure, and detecting vulnerability propagation in target software based on the characteristics of the classified information.

FIG. 7 is a flowchart specifying the operation of S1050 according to an embodiment, and FIG. 8 is a diagram illustrating the operations of preprocessing (b) patch information (a) of code that causes vulnerabilities inherent in open-source software, by classifying the patch information into macro, variable, function, and structure, and detecting vulnerability propagation in target software based on the characteristics of the classified information.

Referring to FIGS. 7 and 8, at step S1051, the apparatus 100 may preprocess the patch information of the code that causes the vulnerabilities inherent in a specific version of the open-source software by classifying the patch information into macro/variable/function/structure. That is, as shown in FIG. 8(*a*), the patch information contains details about the code to be added or deleted for each macro/variable/function/structure that has vulnerabilities. Accordingly, as shown in FIG. 8(*b*), the apparatus 100 may classify and extract the code to be added (+) or deleted (−) for each specific macro/variable/function/structure based on its classification.

In step S1052, the apparatus 100 may generate third hash information by hashing each function or structure included in the target software and fourth hash information by hashing each function or structure included in the patch information.

In step S1053, the apparatus 100 may detect a vulnerability propagated to the macro or variable included in the target software by comparing the code of the macro or variable according to the patch information with the code of the macro or variable included in the target software. For example, if the code of the macro or variable according to the patch information is identical to the code included in the target software, the apparatus 100 may detect that the vulnerability has not been propagated, as the version of the target software used is identical to that in the patch information. On the contrary, if the code of the macro or variable according to the patch information is different from the code included in the target software, the apparatus may 100 detect that the vulnerability included in the reused version of the open-source software has been propagated.

In step S1054, the apparatus 100 may detect a vulnerability propagated to the function or structure included in the target software by comparing the third hash information and the fourth hash information. For example, if the similarity of the third hash information is determined to be identical to that of the fourth hash information, the apparatus 100 may detect that the vulnerability has not been propagated to the function or structure included in the target software, as the version of the target software used is identical to the patch information. On the contrary, if the similarity of the third hash information is determined to be different from that of the fourth hash information, the apparatus 100 may detect that the vulnerability has been propagated to the function or structure included in the reused version of the open-source software.

In other words, in the embodiments shown in FIGS. 7 and 8, given that the functions and structures have longer code lengths than the macros and variables, which can increase the operation time when comparing all code, the apparatus 100 may generate hash information on the code of the target software and the code of the patch information for the functions or structures, and determine the patch status based on the hash information, thereby quickly determining the propagation of vulnerabilities.

Meanwhile, when attempting to detect propagated security vulnerabilities in ten software (Turicreate, ReactOS, FreeBSD, MongoDB, Filament, TizenRT, Aseprite, MAME, Godot, and ArangoDB) currently widely used on GitHub, the present invention achieved a precision of 96% and a recall of 91%, successfully detecting a total of 137 propagated security vulnerabilities across the ten target software. When applying existing version-based vulnerability detection technology (CENTRIS) and code-based vulnerability detection technologies (VUDDY, MOVERY, VOFinder) to the same dataset, CENTRIS showed a precision of 23% and a recall of 68%, VUDDY exhibited a precision of 62% and a recall of 51%, MOVERY achieved a precision of 84% and a recall of 60%, and VOFinder yielded a precision of 78% and a recall of 45%. Furthermore, to evaluate speed and scalability, when the technology proposed in the present invention was applied to 4,434 C/C++ software from GitHub, propagated security vulnerabilities were detected within 20 seconds for over 99% of the target software.

According to the aforementioned embodiments, the present invention can compare the functions included in the target software, which is the subject of vulnerability detection, with the functions included in the open-source software, and classify the functions of open-source software into a first function used identically in the target software, a second function modified and used in the target software, and a third function not used in the target software. In other words, the present invention can identify the portions of code reused by the target software and those that are not reused, and can clearly specify the portions where modifications have been made to the functions of the open-source software. Accordingly, the present invention can detect the vulnerabilities that have been actually propagated from the open-source software to the target software, significantly reducing the problems of false positives and false negatives in security vulnerability detection.

Furthermore, the present invention can classify the patch information of the code that causes vulnerabilities inherent in open-source software by macro, variable, function, and structure, and can efficiently perform code-based vulnerability detection by comparing hash information generated by hashing each function or structure.

As a result, the present invention can be effectively utilized for security vulnerability detection, applied to software supply chain security, and ultimately contribute to the establishment of a secure software ecosystem.

It should be understood that the various embodiments and terms used herein are not intended to limit the technical features described herein to specific embodiments, but are instead meant to encompass various modifications, equivalents, or alternatives of the embodiments. In the description of the drawings, similar or related components may be denoted by similar reference numerals. The singular form of a noun corresponding to an item may refer to one or more items, unless the context clearly indicates otherwise.

As used herein, the phrases "A or B", "at least one of A and B", "at least one of A or B," "A, B, or C," "at least one of A, B, and C," and "at least one of A, B, or C" may include all possible combinations of the items listed in the corresponding phrase. The terms "first", "second", etc. may be used merely to distinguish one component from another, without limiting the components in other aspects (e.g., in terms of importance or order). When a certain (e.g., first) component is referred to as being "coupled" or "connected" to another (e.g., second) component, with or without the terms "functionally" or "communicatively," it means that the component may be connected to the other component directly (e.g., via wired connection), wirelessly, or through a third component.

As used herein, the term "module" may include a unit implemented in hardware, software or firmware, and may be used interchangeably with terms such as logic, logic block, component, or circuit. A module may be a single integral component, or a minimum unit or part thereof, adapted to perform one or more functions. For example, according to an embodiment, the module may be implemented in the form of an application-specific integrated circuit (ASIC).

Various embodiments of the present disclosure may be implemented as software (e.g., a program) comprising one or more instructions stored on a storage medium (e.g., a memory) that can be read by a device (e.g., an electronic device). The storage medium may include a random access memory (RAM), a memory buffer, a hard drive, a database, erasable programmable read-only memory (EPROM), electrically erasable read-only memory (EEPROM), read-only memory (ROM), and/or the like.

Moreover, the processor in the embodiments of the present disclosure may retrieve and execute at least one instruction from one or more instructions stored on the storage medium. This enables the device to perform at least one function according to the at least one retrieved instruction. The one or more instructions may include a code generated by a compiler or a code executable by an interpreter. The processor may be a general-purpose processor, a Field Programmable Gate Array (FPGA), an Application Specific Integrated Circuit (ASIC), a Digital Signal Processor (DSP), and/or the like.

A machine-readable storage medium may be provided in the form of a non-transitory storage medium. Here, the term "non-transitory" means that the storage medium is a tangible device that does not contain signals (e.g., electromagnetic waves), and this term does not distinguish between cases where data is stored semi-permanently or temporarily on the storage medium.

The methods according to various embodiments disclosed herein may be provided as part of a computer program product. The computer program product may be traded as a commodity between a seller and a buyer. The computer program product may be distributed in the form of a machine-readable storage medium (e.g., compact disc read-only memory (CD-ROM)), or it may be distributed (e.g., download or upload) online through an application store (e.g., Play Store) or directly between two user devices (e.g., smartphones). In the case of online distribution, at least a portion of the computer program product may be temporarily stored or generated on a machine-readable storage medium, such as the manufacturer's server, an application store's server, or a server's memory.

According to various embodiments, each of the described components (e.g., modules or programs) may include a singular or plural number of entities. In accordance with various embodiments, one or more of the aforementioned components or operations may be omitted, or one or more other components or operations may be added. Alternatively or additionally, a plurality of components (e.g., modules or programs) may be integrated into a single component. In such a case, the integrated component may perform one or more functions of each of the plurality of components in the same or similar manner as each of the components would perform prior to integration. According to various embodiments, operations performed by a module, program, or other component may be carried out sequentially, in parallel, repeatedly, or heuristically, or one or more of the operations may be executed in a different order or omitted, or one or more other operations may be added.

BRIEF DESCRIPTION OF REFERENCE NUMERALS

100: apparatus
110: memory
120: processor
130: input/output interface
140: communication interface While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method of operation for a security vulnerability propagation detection apparatus operating by a processor, the method comprising the operations of:
   obtaining version information of target software and open-source software used in the target software;
   classifying functions included in the version of open-source software into a first function used identically in the target software, a second function modified and used, and a third function not used;
   determining whether the second function has been patched, based on a first similarity between the second function and an original function of the version and a second similarity between the second function and a patch function of the version;
   detecting a vulnerability propagated to the target software from vulnerabilities inherent in the version of open-source software, based on the classification of the first function, the second function, and the third function, and the patch status of the second function; and
   detecting a propagated vulnerability based on a code by comparing patch information of the code that causes the vulnerabilities inherent in the version of open-source software with the target software, by macro, variable, function, and structure.

2. The method according to claim 1, wherein the version information includes information on functions included in the version of open-source software, vulnerabilities inherent in the version of open-source software, functions causing the vulnerabilities, and patch functions that supplement the functions causing the vulnerabilities.

3. The method according to claim 1, wherein the operation of classifying comprises:

generating first hash information by hashing the functions included in the target software and second hash information by hashing the functions included in the open-source software;

deriving the similarity between the first hash information and the second hash information; and classifying the functions included in the open-source software into one of the first function, the second function, and the third function based on a predefined range for the derived similarity.

4. The method according to claim 1, wherein the operation of determining the patch status comprises:

if the first similarity is greater than the second similarity, determining that the second function is a function in which the vulnerability inherent in the original function has not been patched; and if the second similarity is greater than the first similarity, determining that the second function is a function in which the vulnerability inherent in the original function has been patched.

5. The method according to claim 4, wherein the operation of detecting a vulnerability comprises:

detecting that the vulnerability corresponding to the first function, inherent in the open-source software, has been propagated;

detecting that the vulnerability of the second function, determined to be patched, has not been propagated;

detecting that the vulnerability of the second function, determined to be unpatched, has been propagated; and detecting that the vulnerability corresponding to the third function has not been propagated.

6. The method according to claim 1, wherein the operation of detecting a propagated vulnerability based on the code comprises the operations of:

classifying the patch information of the code that causes the vulnerabilities inherent in the open-source software by macro, variable, function, and structure;

generating third hash information by hashing each function or structure included in the target software and fourth hash information by hashing each function or structure included in the patch information;

detecting a vulnerability propagated to the macro or variable included in the target software by comparing the code of the macro or variable according to the patch information with the code of the macro or variable included in the target software; and detecting a vulnerability propagated to the function or structure included in the target software by comparing the third hash information with the fourth hash information.

7. The method according to claim 6, wherein the operation of detecting a vulnerability propagated to the macro or variable comprises the operations of:

detecting that the vulnerability has not been propagated if the code of the macro or variable according to the patch information is identical to the code included in the target software; and detecting that the vulnerability included in the reused version of open-source software has been propagated if the code of the macro or variable according to the patch information is not identical to the code included in the target software.

8. The method according to claim 6, wherein the operation of detecting that the vulnerability propagated to the function or structure comprises the operations of:

detecting that the vulnerability has not been propagated to the function or structure included in the target software if the similarity of the third hash information is determined to be identical to that of the fourth hash information; and detecting that the vulnerability has been propagated to the function or structure included in the reused version of open-source software if the similarity of the third hash information is determined to be different from that of the fourth hash information.

9. A security vulnerability propagation detection apparatus comprising:

a memory having instructions stored thereon; and a processor performing predetermined operations based on the instructions, wherein the operations of the processor comprise:

obtaining version information of target software and open-source software used in the target software;

classifying functions included in the version of open-source software into a first function used identically in the target software, a second function modified and used, and a third function not used;

determining whether the second function has been patched, based on a first similarity between the second function and an original function of the version and a second similarity between the second function and a patch function of the version;

detecting a vulnerability propagated to the target software from vulnerabilities inherent in the version of open-source software, based on the classification of the first function, the second function, and the third function, and the patch status of the second function; and detecting a propagated vulnerability based on a code by comparing patch information of the code that causes the vulnerabilities inherent in the version of open-source software with the target software, by macro, variable, function, and structure.

\* \* \* \* \*